Jan. 1, 1963
J. W. SEIGH ETAL
3,071,258
BUNDLE INVERTING MEANS
Filed April 9, 1959
7 Sheets-Sheet 1
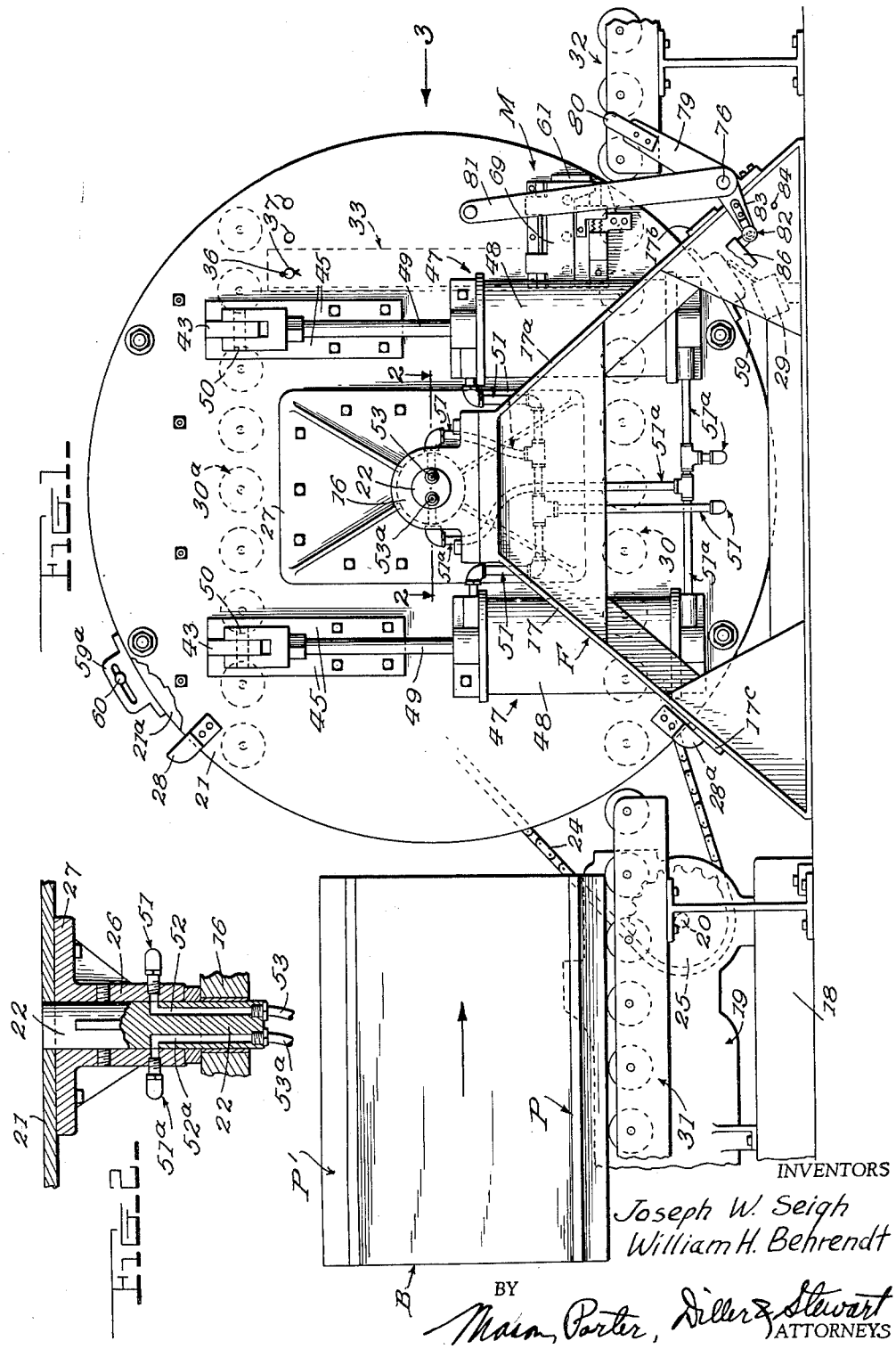
INVENTORS
Joseph W. Seigh
William H. Behrendt
BY
Mason, Porter, Diller & Stewart
ATTORNEYS

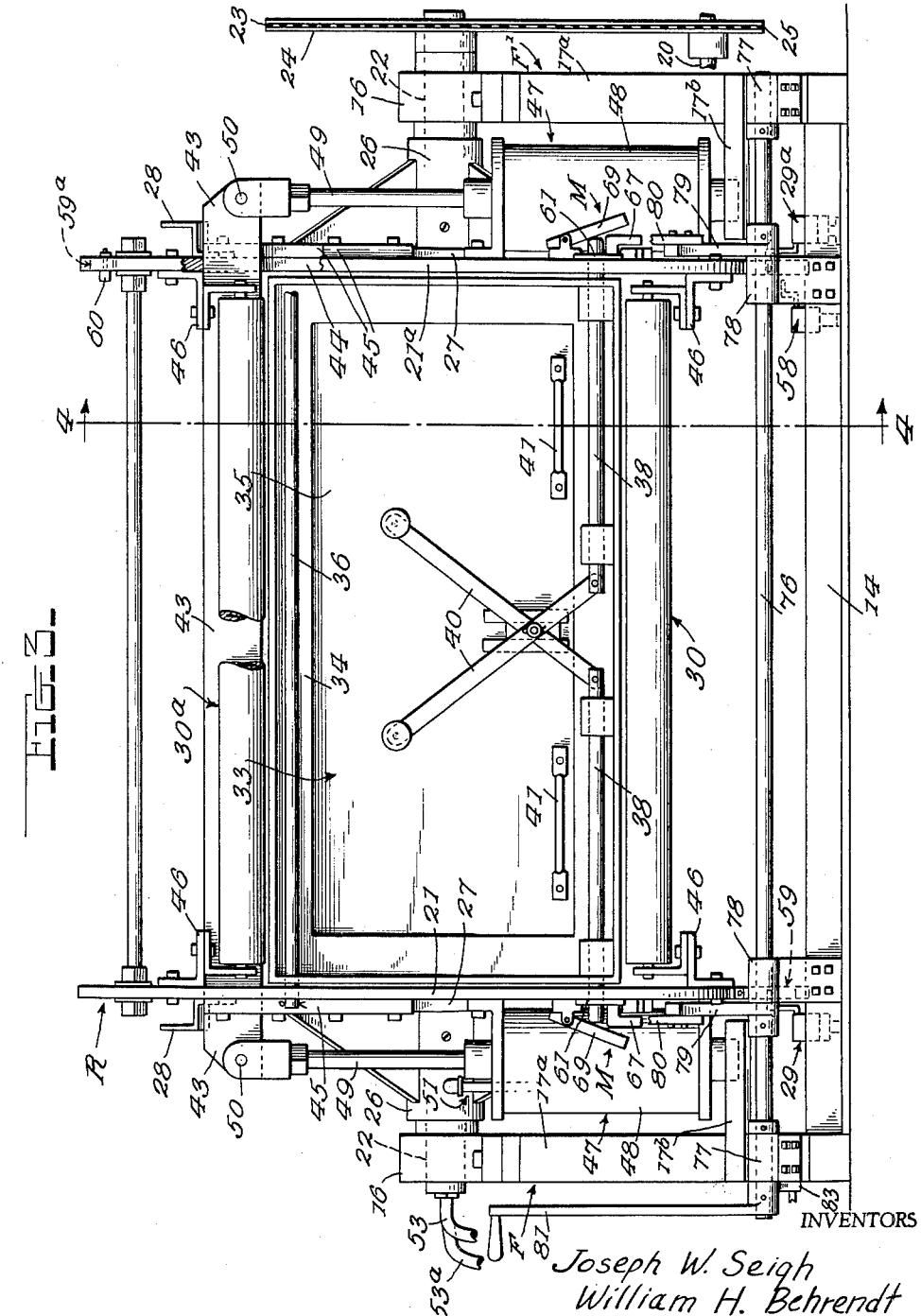

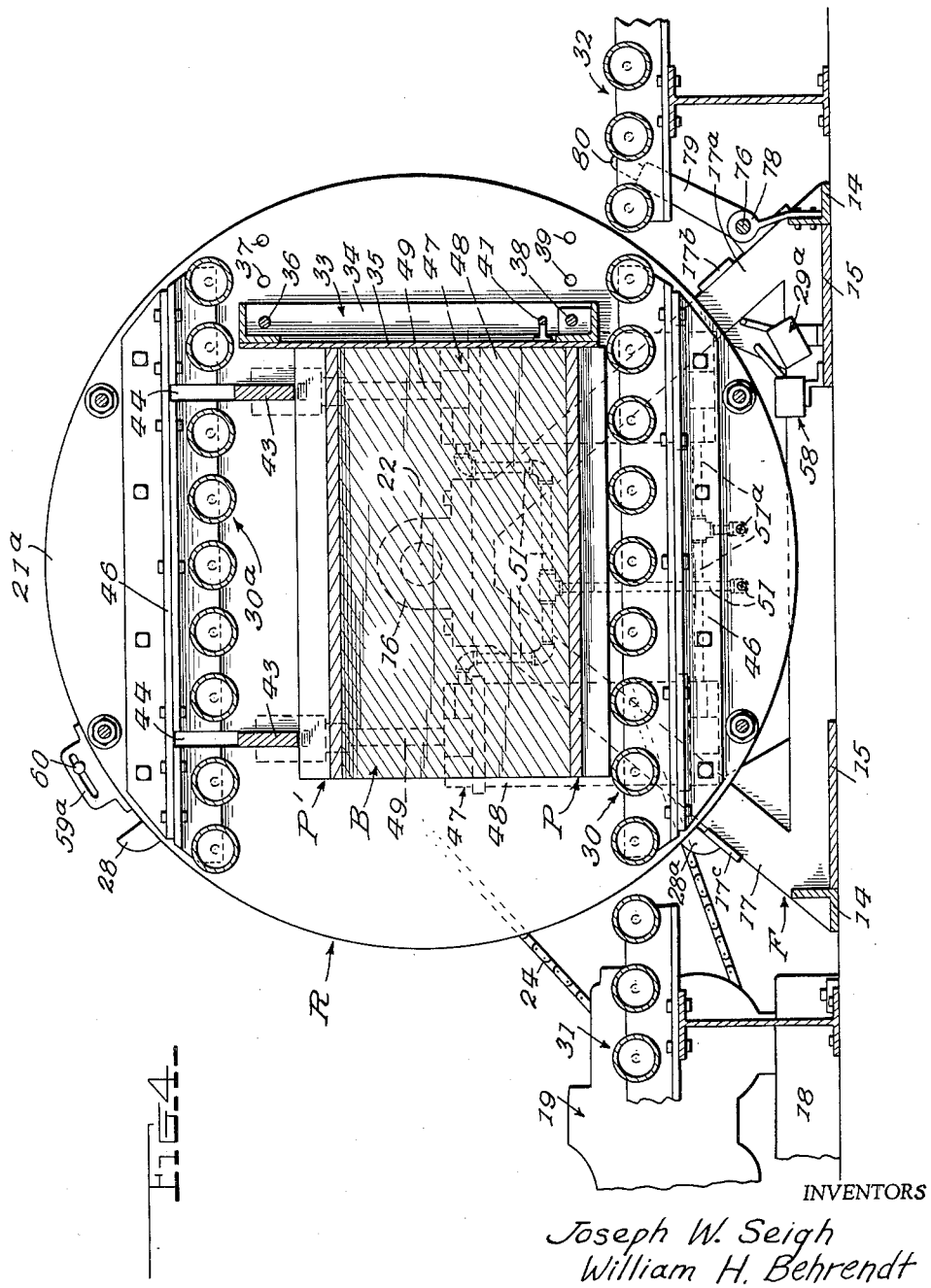

Jan. 1, 1963  J. W. SEIGH ETAL  3,071,258
BUNDLE INVERTING MEANS
Filed April 9, 1959  7 Sheets-Sheet 4
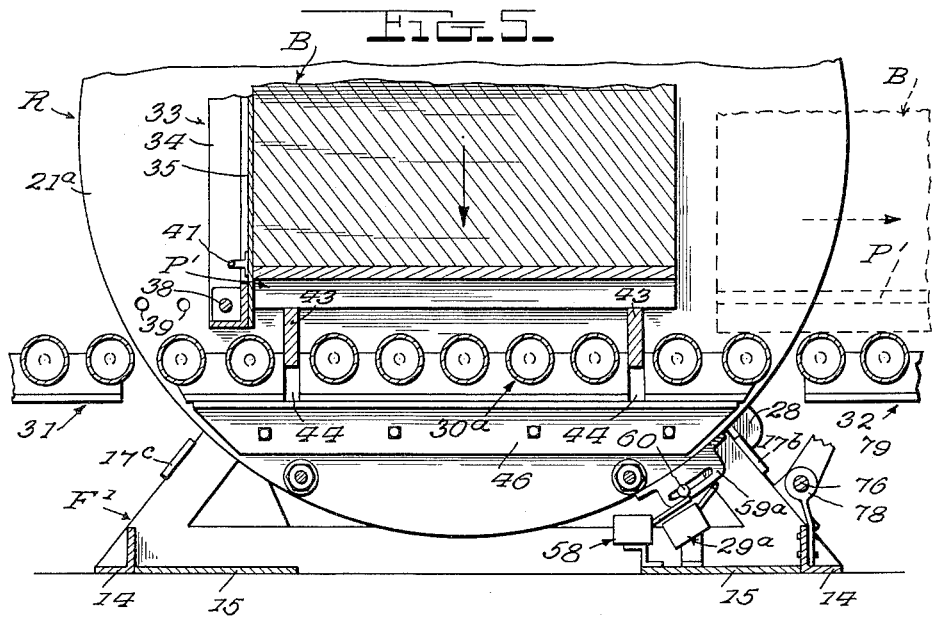
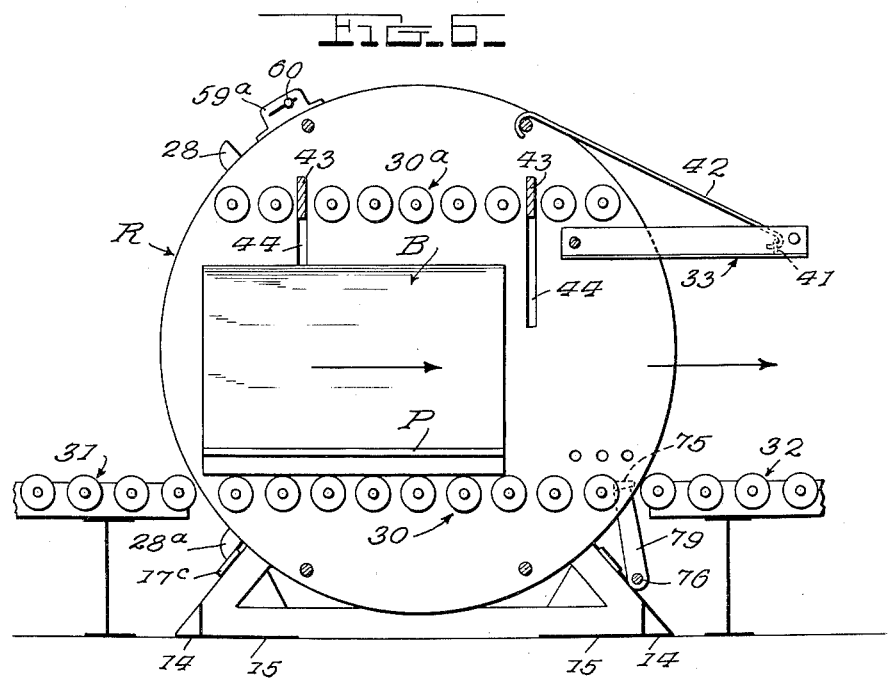
INVENTORS
Joseph W. Seigh
William H. Behrendt
BY Mason, Porter, Diller & Stewart
ATTORNEYS Jan. 1, 1963 J. W. SEIGH ETAL 3,071,258
BUNDLE INVERTING MEANS
Filed April 9, 1959 7 Sheets-Sheet 5
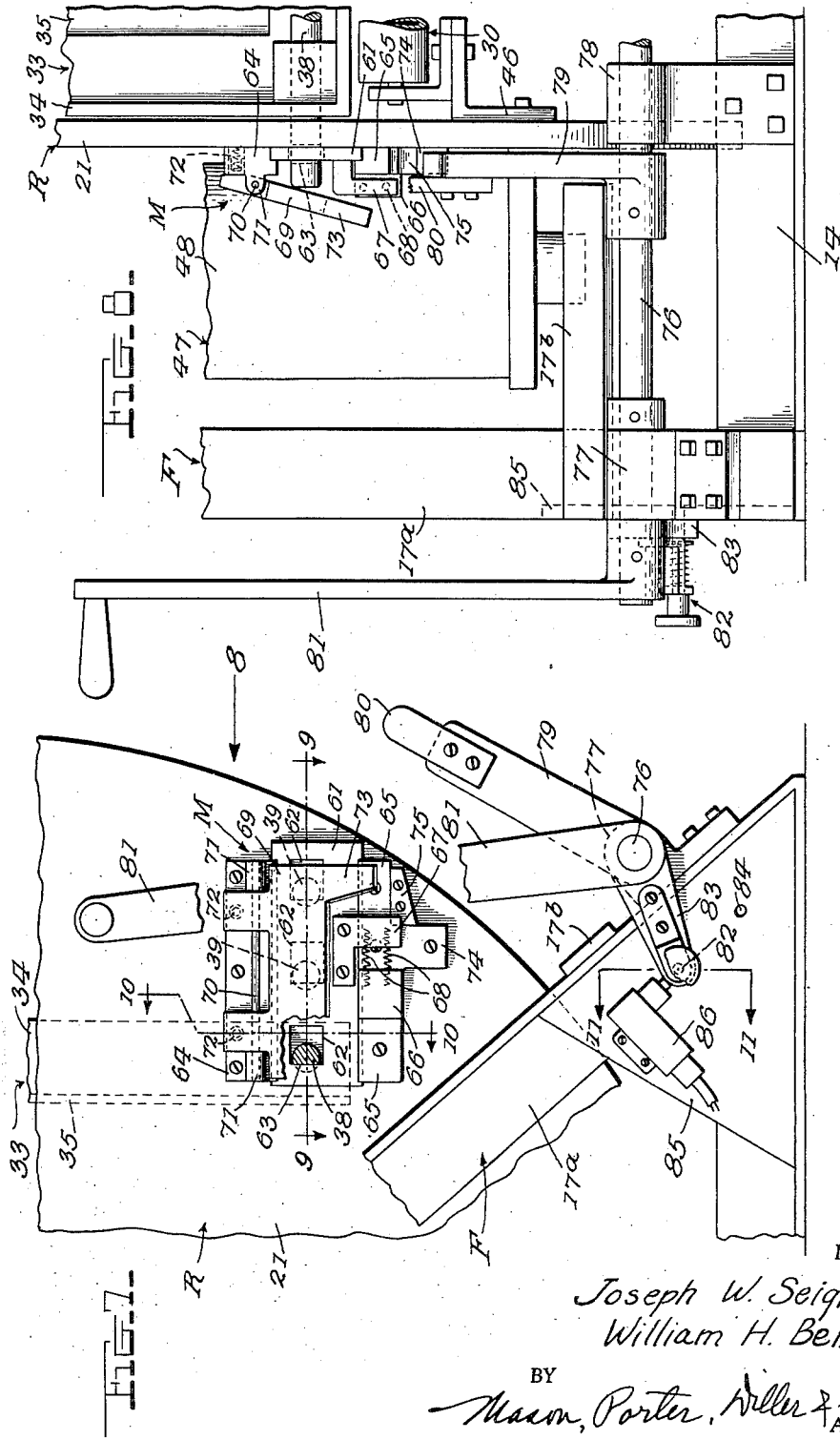
INVENTORS
Joseph W. Seigh
William H. Behrendt
BY
Mason, Porter, Diller & Stewart
ATTORNEYS

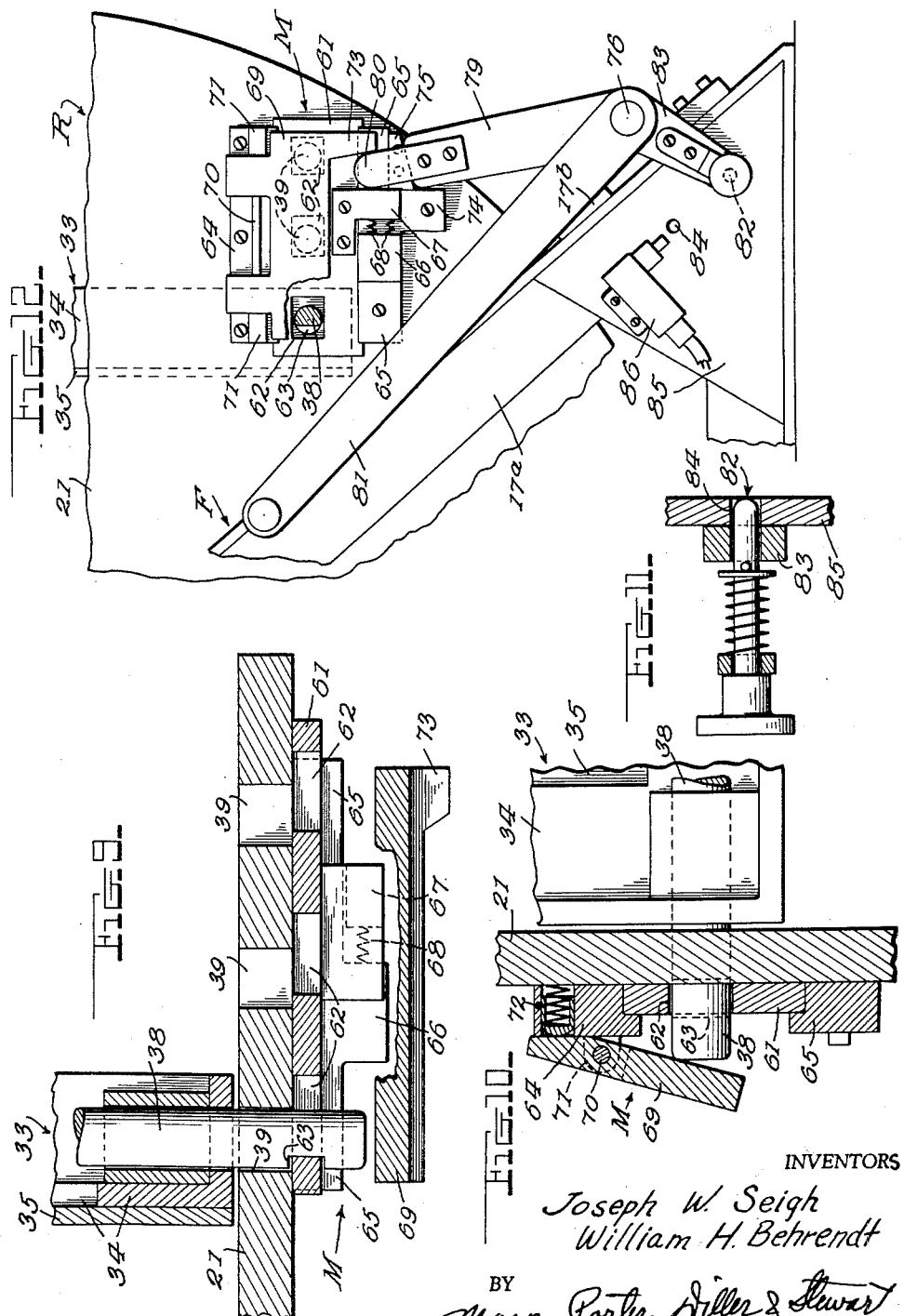

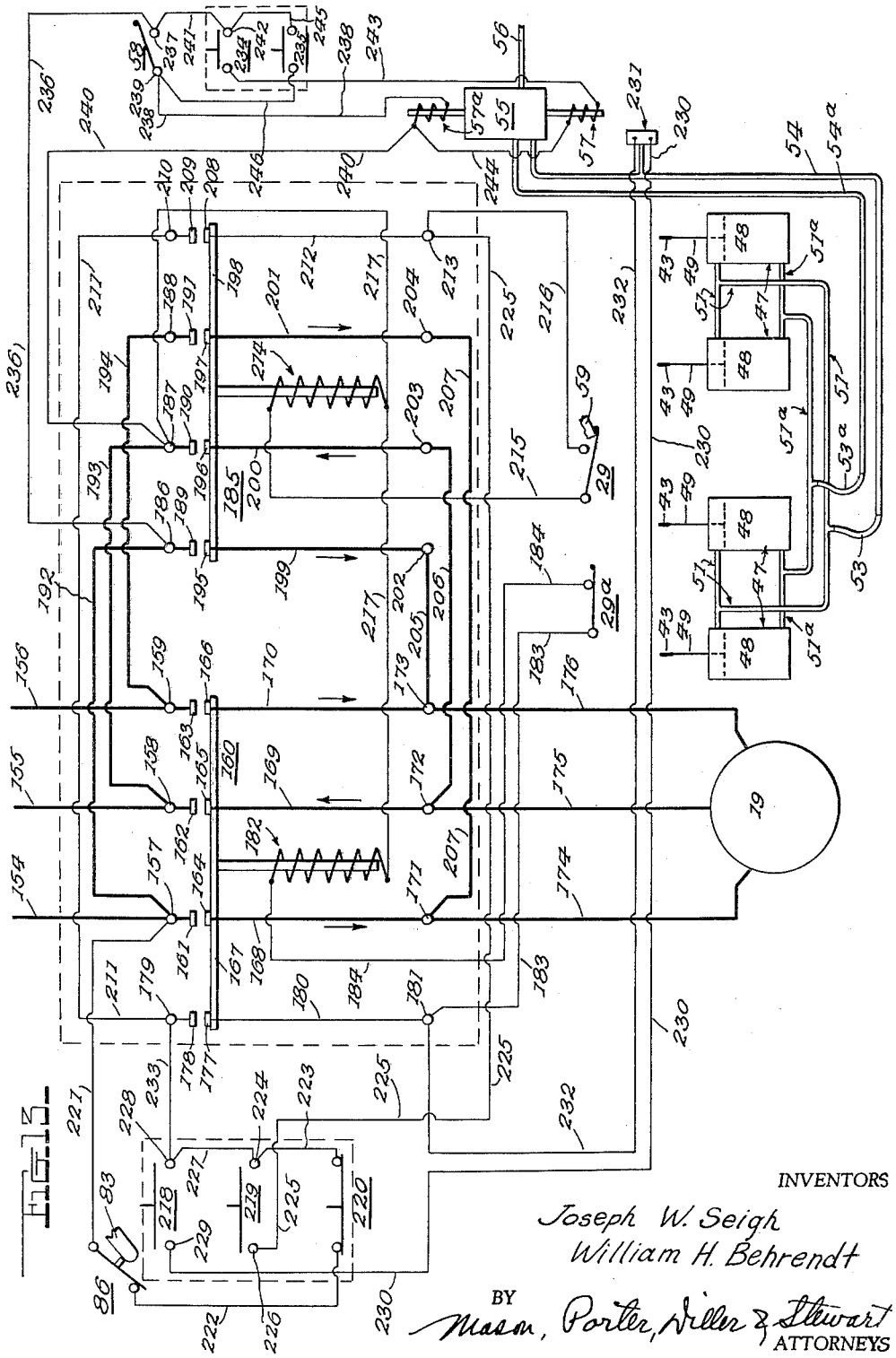

United States Patent Office 3,071,258
Patented Jan. 1, 1963

3,071,258
BUNDLE INVERTING MEANS
Joseph W. Seigh, Teaneck, N.J., and William H. Behrendt, Baltimore, Md., assignors to Continental Can Company, Inc., New York, N.Y., a corporation of New York
Filed Apr. 9, 1959, Ser. No. 805,215
16 Claims. (Cl. 214—1)

In the art of can manufacture in which lacquered metal sheets are to be used, it is customary to feed the sheets successively from a stack, coat one side of the successively fed sheets, dry the coatings, re-stack the sheets on a pallet in a pile or bundle, invert the bundle, again successively feed the sheets, coat the other sides thereof, and dry the coatings.

A machine for inverting the bundles is disclosed in the United States patent application of Walter C. Jones and William K. Brown, filed Mar. 13, 1959, Serial No. 799,290. That machine includes a bundle inverting rotor interposed between one stationary roller conveyor extending from the first sheet coating means and a second stationary roller conveyor extending to the second sheet coating means. The rotor includes a lower roller conveyor and an upper roller conveyor between which each bundle to be inverted is fed from the aforesaid one stationary roller conveyor, and a vertical wall is embodied in the rotor structure to limit the movement of the bundle into the rotor. Manually controlled electrically driven means is provided for turning the rotor to a bundle inverting position and the inverted bundle is moved from the rotor onto the aforesaid second stationary conveyor. The rotor actuating means is then operated to reversely turn the rotor back to its bundle receiving position.

Each bundle fed to the rotor is supported by a pallet and after reception of the bundle in the rotor, it is necessary to substantially fill the space between the bundle and the upper roller conveyor of the rotor, by inserting one or more pallets into said space, in order that the bundle shall be held against too much loose movement during inversion.

The above identified machine also includes provision permitting movement of the aforesaid wall of the rotor to an out-of-the-way position, in case no bundle inversion is required and the lower roller conveyor of the rotor is simply to be used as a bridge between the two stationary roller conveyors, when only one side of the metal sheets is to be coated. A locking means is employed to lock the rotor when such roll-through operation of the machine is required.

While the machine has been advantageous to a large extent, the necessity of substantially filling the space between the bundle and the upper roller conveyor, has required time and has necessitated that a large supply of pallets be kept on hand at the rotor, when inverting bundles having relatively little height, and the bundles have not, in all cases, been held as effectively as desired. One object of the present invention, therefore, has been to provide novel means movable downwardly onto any bundle in the rotor, regardless of the bundle height, effective to tightly clamp the bundle against the lower roller conveyor of the rotor during bundle inversion, and then effective to lower the inverted bundle onto the other roller conveyor of the rotor.

Another object has been to provide for moving the bundle clamping means to operative position by manual closing of a switch and to provide for automatic bundle-lowering movement of said clamping means when bundle inversion has been completed.

In the above identified machine, it was possible to move the aforesaid wall to an out-of-the-way position for "roll through" operation and to neglect locking of the rotor, resulting in lost motion oscillation of the rotor during movement of the bundles therethrough, thereby placing jerking strains on the rotor actuating means and causing noisy operation. A further object of the present invention has therefore been to provide novel means which locks the aforesaid wall against movement from its normal position until the rotor has been locked.

In this regard, a still further object has been to prohibit any possibility of starting the rotor actuating means while the rotor is locked.

Yet another object has been to provide novel means to prohibit release of the locked rotor until the aforesaid wall has been restored to its operative position.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevation showing the improved machine in bundle receiving position.

FIGURE 2 is a detail horizontal sectional view on line 2—2 of FIGURE 1.

FIGURE 3 is an end elevation as indicated by the arrow 3 of FIGURE 1.

FIGURE 4 is a vertical longitudinal sectional view on the plane of line 4—4 of FIGURE 3, but showing a bundle clamped in the rotor in readiness for inversion.

FIGURE 5 is a fragmentary view similar to FIGURE 4 but showing the bundle inverted and being lowered.

FIGURE 6 is a diagrammatic view showing the machine conditioned for roll-through operation.

FIGURE 7 is an enlarged fragmentary side elevation showing the mechanism which normally locks the vertical wall in operative position, prohibits movement of said wall to an out-of-the-way position until the rotor has been locked, and prevents release of the rotor until said wall has been restored to its operative position.

FIGURE 8 is a fragmentary elevation as indicated by the arrow 8 of FIGURE 7.

FIGURES 9, 10 and 11 are further enlarged detail sectional views on the correspondingly numbered lines of FIGURE 7.

FIGURE 12 is a view similar to FIGURE 7 but showing the rotor locked and the vertical wall released for movement to an out-of-the-way position as in FIGURE 6.

FIGURE 13 is a diagram showing the operating means for the clamp means and the various electrical controls.

The construction disclosed in the drawings will be rather specifically described but attention is invited to the possibility of making variations within the scope of the invention.

A rigid frame structure is shown upon which to mount the rotor R. This frame structure comprises two side frames F and F' rigidly connected by transverse base members 14 and 15 and disposed in parallel vertical planes. Each side frame has a bearing 16 at its upper end, and two inclined bars 17 and 17$^a$ which diverge downwardly from said bearing. Near the side frame F', there is a support 18 upon which a reversible electric motor 19 is mounted to drive the rotor R. The motor 19 is of three phase type and includes reduction gearing between its armature shaft and its output shaft 20.

The rotor R includes two parallel vertical side disks 21 and 21$^a$ near the side frames F and F' respectively and provided with trunnions 22 mounted in the bearings 16. The trunnion of the disk 21$^a$ has a sprocket 23 connected by a chain 24 with a drive sprocket 25 on the motor shaft 20. The trunnions 22 are preferably secured in hubs 26 on plates 27 which are bolted to the disks 21 and 21$^a$.

Each of the disks 21 and 21ª has one lateral stop 28 to limit the turning of the rotor 12 to its bundle inverting position, and another lateral stop 28ª to limit return of the rotor to its bundle receiving position. The stops 28 strike the upper sides of stop plates 17ᵇ secured to the inclined bars 17ª and the stops 28ª strike the upper sides of other stop plates 17ᶜ secured to the inclined bars 17. Stationarily mounted near the lower edges of the disks 21 and 21ª respectively, there are two limit switches 29 and 29ª which are instrumental in effecting breaking of the motor circuit when the rotor R has been turned to either of its positions.

A lower roller conveyor 30 and an upper roller conveyor 30ª are both disposed between and mounted on the side disks 21 and 21ª. When the rotor R occupies its bundle receiving position (FIGURES 1 and 4) the lower roller conveyor 30 is in position to receive a bundle B from the roller conveyor 31 which extends from the first sheet coating and drying means. The bundle is supported as usual on a suitable pallet P. After reception of the bundle by the lower conveyor 30, or immediately prior to such reception, an additional pallet P' is placed upon this bundle. The bundle and pallets are then clamped and inverted by the rotor R. When the bundle is inverted (FIGURE 5) the clamped bundle is lowered onto the conveyor 30ª which is then in position to deliver the bundle B, then supported by the pallet P', onto a roller conveyor 32 which extends to the second sheet coating and drying means.

A vertical wall 33 extends between and is secured to the side disks 21 and 21ª at one end of the roller conveyors 30 and 30ª, to limit the movement of the bundle B onto the conveyor 30, as seen in FIGURE 4. This wall comprises a rigid rectangular frame 34 and a plate 35 secured thereto.

The upper end of the wall 33 is pivoted to the disks 21 and 21ª by means of a rod 36 and said disks have openings 37 which allow adjustment of said rod and wall toward and from the axis of the rotor R, according to the size of the bundles to be inverted. The lower end of the wall 33 is provided with bolts 38 engageable with openings 39 in the disks 21 and 21ª according to the position of the wall 33. Crossed hand levers 40 (FIGURE 3) are provided to retract the bolts 38, allowing upward swinging of the wall 33 to the out-of-the-way position of FIGURE 6, when no bundle inversion is required and the lower roller conveyor 30 is to be utilized only as a bridge between the stationary conveyors 31 and 32 to allow the bundles B to roll through the rotor R. Handles 41 are provided on the wall 33 to facilitate movement of said wall to and from the position of FIGURE 6 and a hook or the like 42 is provided to secure said wall in said position.

Due to novel locking mechanisms M hereinafter described in detail, the wall 33 cannot be moved to the position of FIGURE 6 until the rotor R has been locked in a fixed position and the rotor cannot be released until said wall 33 has been restored to its operative position. Before describing the mechanisms M the means for clamping the bundle B in the rotor R will be explained.

*Bundle Clamping Means*

Two transverse clamp bars 43 are normally disposed between rollers of the upper conveyor 30ª and at their ends extend through vertical slots 44 in the rotor side disks 21 and 21ª. These disks are provided with machined guides 45 for guiding the clamp bars 43 from the normally raised position of FIGURES 1 and 3 to the lowered bundle-clamping position of FIGURE 4 and vice versa. The upward movement of the clamp bars is in the present instance limited by the uppermost of two angle bars 46 by means of which the roller conveyors 30 and 30ª are mounted on the disks 21 and 21ª.

Cylinder and piston assemblies 47 are provided for pneumatically operating the clamp bars 43; and the cylinders 48 of said assemblies are secured to the outer sides of the disks 21 and 21ª. The piston rods 49 are connected at 50 to the ends of the clamp bars 43. Branched piping 51 is provided to conduct compressed air to or exhaust it from the upper ends of the cylinders 48; and additional branched piping 51ª is provided to conduct compressed air to or exhaust it from the lower ends of said cylinders. The piping 51 receives compressed air from a port 52 (FIGURE 2) in the trunnion 22 of the rotor disk 21; and the piping 51ª receives compressed air from a port 52ª in said trunnion. Flexible hoses 53 and 53ª conduct compressed air to the ports 52 and 52ª from two stationary lines 54 and 54ª (FIGURE 13) respectively. These lines 54 and 54ª are connected with a known type of valve 55 (FIGURE 13) which receives compressed air through a pipe 56. According to the setting of the valve 55, it directs compressed air to one end of the cylinders 48 and simultaneously exhausts air from the other end of said cylinders, or vice versa.

Two actuating coils 57 and 57ª are provided for the valve 55. Coil 57, when energized, sets the valve 55 to simultaneously supply compressed air to the upper ends of the cylinders 48 and exhaust air from the lower ends of said cylinders. Coil 57ª, when energized, sets the valve 55 to simultaneously supply compressed air to the lower ends of the cylinders 48 and exhaust air from the upper ends of said cylinders. The setting of the valve 55 thus controls the clamping and releasing movements of the clamp bars 43.

When the bars 43 are lowered to the position shown in FIGURE 4, by retraction of the piston rods 49, they clamp the bundle B and the associated pallets P and P' against movement on the lower roller conveyor 30, in readiness for inversion. Thus, when turning of the rotor R to bundle inverting position is complete, the clamp bars 43 support the pallets and the bundle B above the then lower roller conveyor 30ª. However, such support is only momentary as the piston rods are automatically re-extended to lower the load onto said conveyor 30ª, as will be clear from FIGURE 5. The load lowering is effected by virtue of a third switch 58 associated with the coil 57ª of the valve 55 (FIGURE 13). The switch 58 is mounted near the limit switch 29ª as seen in FIGURES 3, 4 and 5.

A cam 59ª on the rotor disk 21ª, opens the limit switch 29ª when the rotor R has almost completed its bundle inverting movement (clockwise in FIGURE 4) and thus breaks the circuit of the motor 19. The rotor, however, drifts somewhat before the stops 28 strike the stops 17ᵇ; and during this drifting, a stud 60 on the cam 59ª closes the switch 58 to so set the valve 55 as to lower the load onto the conveyor 30ª, as seen in FIGURE 5.

Another cam 59 is provided on the rotor disk 21 to open the limit switch 29 and break the motor circuit when the rotor nears the completion of its return movement (counter-clockwise) back toward the position of FIGURE 1. The rotor then drifts slowly and finally comes to rest when the stops 28ª strike the stops 17ᶜ. The rotor is then again in bundle receiving position (FIGURE 1) with the clamp bars 43 in their uppermost positions.

*Rotor and Wall Locking Mechanisms*

Two of the mechanisms M are provided, mounted respectively on the two rotor side disks 21 and 21ª as seen in FIGURE 3. These mechanisms are of the same construction and while this construction appears only on a small scale in some views, it is fully illustrated in FIGURES 7, 8, 9, 10 and 12.

The mechanism M coacts with the outer end of the bolt 38 of the wall 33 to normally lock this bolt in operative position regardless of which one of the openings 39 receives said bolt. A bolt locking slide 61 is mounted at the outer side of the rotor disk 21 for horizontal movements; and said slide has openings 62, any one of which may receive the outer end of the bolt 38, according to the position in which the wall 33 is set. The bolt end has a notch 63 which normally receives the inner end of the opening 62 through which the bolt end extends. Upper and lower guide tracks 64 and 65 are secured to the disk 21 and engage the upper and lower edges of the slide 61 to mount this slide for the required movements. The lower track 65 has a lateral lug 66 and the slide 61 has a downwardly projecting finger 67 near said lug. Coiled compression springs 68 act against the finger 67 and react against the lug 66 to yieldably hold the slide in engagement with the notch 63 of the bolt 38, as is best seen in FIGURES 7 and 9.

A locking plate 69 is pivoted by a rod 70 to lugs 71 on the upper track 64 and extends downwardly in position to abut the outer end of the bolt 38. This bolt end normally holds the locking plate 69 in the inclined position of FIGURES 8 and 10 but spring means 72 acts on said locking plate to swing it inwardly toward the disk 21 when permitted to do so. The locking plate 69 has a downwardly projecting finger 73 which is spaced toward the edge of the disk 21 from the finger 67 of the slide 61.

The lower track 65 has a downwardly projecting lug 74 between its ends. In the angle between this lug 74 and the outer end portion of the track 65, an abutment block 75 is secured to the disk 21, providing a downwardly facing shoulder for a purpose to appear.

A transverse rock shaft 76 is mounted in bearings 77 secured to the side frame bars 17ª and in other bearings 78 secured to one of the transverse frame members 14. The rock shaft 76 has an upstanding arm 79 near each end thereof for coaction with the abutment block 75 of the mechanism M, when said rock shaft is turned from the normal position of FIGURES 1 and 7 to the position of FIGURE 12. When in this latter position, the upper end of the arm 79 abuts the lower edge of the abutment block 75 and holds the rotor R against any turning in one direction. At the same time, the rotor stops 28ª abut the fixed stops 17ᶜ as shown in FIGURE 6. Any turning of the rotor R in the other direction is thus prohibited. The rotor is thus locked in the position of FIGURE 6 for roll-through operation of the machine. To prepare the machine for such operation, the wall 33 must be released and hooked in upwardly swung position.

To accomplish release of the wall 33, the arm 79 has an upstanding finger 80 which pushes against the finger 67 of the locking slide 61 when said arm 79 is swung from the position of FIGURE 7 to that of FIGURE 12, thereby shifting said slide 61 to the released position of FIGURE 12. This permits retraction of the bolts 38 to allow upward swinging of the wall 33. As the bolts 38 are being withdrawn, the spring means 72 swings the locking plate 69 inwardly, disposing its finger 73 in the outward path of the arm-carried finger 80 as seen in FIGURE 12. The rock shaft 76 cannot therefore be turned back to the FIGURE 7 position until the locking plate 69 is released by re-bolting of the wall 33 in operative position. When such rebolting is effected, the end of the bolt 38 swings the locking plate 69 outwardly, thereby releasing the finger 80 and allowing turning of the rock shaft 76 back to the position of FIGURE 7. When such turning occurs, the slide 61 again locks the bolt 38 in operative position.

The rock shaft 76 has a hand crank 81 for turning it to either of its positions; and a spring-pressed pin 82 is provided to hold said shaft in either of said positions. This pin 82 is mounted on a downwardly projecting arm 83 on the rock shaft 76 and is engageable with either of two openings 84 in a fixed plate 85 forming part of the side frame F.

A switch 86 is secured to the plate 85 and is of self-opening type. This switch must be held closed in order that the rotor R may be actuated by the motor 19, as will be clear when the diagram of FIGURE 13 is explained. When the shaft 76 is in the FIGURE 7 position, for bundle inverting operation of the machine, the arm 83 holds the switch 86 closed. However, when the shaft 76 is turned to the rotor locking position of FIGURE 12, the arm 83 allows the switch 86 to open.

It will be seen from the above that the two mechanisms M and associated elements (1) prohibit use of the machine in the roll-through manner depicted in FIGURE 6 until the rotor R is locked; (2) prohibit possible energizing of the rotor driving motor 19 while said rotor is locked; (3) prohibit release of the rotor for bundle inverting operation until said rotor has been prepared for such normal operation by re-bolting the wall 33 in operative position.

*Electrical System*

FIGURE 13 diagrammatically shows the relation of elements when the rotor R occupies the bundle receiving position of FIGURE 1. The limit switches 29 and 29ª are shown toward the lower portion of the view, switch 29 is held open by the cam 59, and switch 29ª occupies closed position. Switch 58 is shown at the upper right portion of the view and occupies open position. Switch 86 is shown at the upper left portion of the view and is held in closed position by the arm 83. These switches and their functions have been mentioned above but other switches are employed and will be described during the course of the following explanation.

Three line wires 154, 155 and 156 extend to three terminals 157, 158 and 159 of a motor switch 160. This switch is diagrammatically shown as including fixed contacts 161, 162 and 163 electrically connected respectively with the terminals 157 to 159, and as also including movable contacts 164, 165 and 166 for coaction with said fixed contacts 161 to 163, respectively. The contacts 164 to 166 are mounted on a movable carrier 167 and are connected by conductors 168, 169 and 170 with the load terminals 171, 172 and 173. From these terminals, wires 174, 175 and 176 extend to the motor 19.

An additional contact 177 is mounted on the carrier 167 for coaction with a fixed contact 178 which is connected with a terminal 179. A conductor 180 extends from the movable contact 177 to a terminal 181.

The switch 160 is of self-opening type and includes a coil 182 for closing it when energized to operate the motor 19 and cause turning of the rotor R in bundle inverting direction. One wire 183 extends from the terminal 181 to one terminal of the limit switch 29ª and another wire 184 extends from the other terminal of this switch 29ª to the coil 182.

A second motor switch 185 is provided to cause driving of the motor 19 in a direction to return the rotor R to bundle receiving position. The switch 185 includes terminals 186, 187 and 188 to which fixed contacts 189, 190 and 191 are connected, respectively. The terminal 186 is connected by a conductor 192 to the terminal 157 of the switch 160; the terminal 187 is connected by a conductor 193 to the terminal 158 of said switch 160; and the terminal 188 is connected by a conductor 194 with the terminal 159 of said switch 160. Contacts 195, 196 and 197 are cooperable with the contacts 189, 190 and 191, respectively, and are mounted on a movable carrier 198. Conductors 199, 200 and 201 connect the contacts 195, 196 and 197 with load terminals 202, 203 and 204, respectively. One conductor 205 connects the terminal 202 with the terminal 173 of the switch 160; another conductor 206 connects the terminal 203 to the terminal 172 of said switch 160, and a third conductor 207 connects the terminal 204 to the terminal 171 of said switch 160.

An additional contact 208 is mounted on the carrier 198 for coaction with a fixed contact 209 which is connected with a terminal 210. A conductor 211 connects the terminal 210 to the terminal 179 of the switch 160, and a conductor 212 connects the contact 208 to a terminal 213.

The switch 185 is of self-opening type and includes a coil 214 for closing it when energized. A conductor 215 extends to the coil 214 from one terminal of the limit switch 29, and another conductor 216 extends to the other terminal of said switch 29 from the terminal 213. A return conductor 217 is connected with both of the coils 182 and 214 and extends to the terminal 187 of the switch 185.

At the upper left of FIGURE 13, three switches 218, 219 and 220 are shown. The switch 218 is a self-opening manually-closed control switch and is closed to cause motor operation for turning the rotor R in bundle inverting direction. The switch 219 is a self-opening manually-closed control switch and is closed to cause motor operation for returning the rotor R to bundle receiving position after bundle inversion. The switch 220 is a normally closed cut-off or safety switch which may be manually opened should the necessity arise. All of the switches 218, 219 and 220 are of push button type and mounted on a suitable control panel.

A conductor 221 extends from the terminal 157 of the motor switch 160 to the switch 86, and another conductor 222 extends from this switch 86 to the safety switch 220. A conductor 223 extends from this switch 220 to one terminal 224 of the control switch 219, and another conductor 225 connects the other terminal 226 of said switch 219 with the terminal 213 of the motor switch 185. A conductor 227 extends from the terminal 224 of control switch 219 to one terminal 228 of the control switch 218. From the other terminal 229 of this switch 218, a conductor 230 extends to a self-opening, pressure-closed switch 231 shown at the lower right of FIGURE 13. This switch 231 is connected with the line 54 which supplies compressed air to the cylinder 48 to lower the clamp bars 43. Another conductor 232 extends from the switch 231 to the terminal 181 of the motor switch 160. If the air pressure in the line 54 should be below normal, switch 231 will remain open and the switch 218 cannot therefore perform the function of starting the motor 19. Turning of the rotor R to invert a bundle is thus prohibited unless the air pressure be sufficient to effectively clamp the bundle.

A conductor 233 connects the terminal 228 of the switch 218 with the terminal 179 of the motor switch 160.

At the upper right of FIGURE 13, two control switches 234 and 235 are shown for the compressed air valve 55. Both of these switches are of self-opening, manually closed, push button type. Both of these switches and the cam-closed switch 58 are used to control the compressed air valve 55 and therefore the three switches have been grouped.

A conductor 236 extends from the terminal 186 of the motor switch 185 to one terminal 237 of the switch 58 and another conductor 238 extends from the other terminal 239 of said switch 58 to the valve actuating coil 57ª. Another conductor 240 extends from the coil 57ª to the terminal 187 of the motor switch 185.

A conductor 241 connects the terminal 237 of the switch 58 with one terminal 242 of the switch 234, and a conductor 243 extends from the other terminal of said switch 234 to the valve actuating coil 57. From this coil, another conductor 244 extends to the conductor 240.

A conductor 245 extends from the terminal 242 of the switch 234 to one terminal of the switch 235 and another conductor 246 extends from the other terminal of said switch 235 to the terminal 239 of the switch 58.

Normal Operation

When the machine is to be used for bundle inversion, the rotor R first occupies the position shown in FIGURE 1, with its wall 33 bolted in operative position. At this time (see FIGURE 13) most of the switches occupy open positions but the switches 29ª, 86 and 220 are in closed position. The clamp bars 43 occupy raised position as shown in FIGURES 1 and 3 and diagrammatically illustrated in FIGURE 13.

A bundle B, supported by a pallet P, is rolled from the conveyor 31 onto the lower conveyor 30 of the rotor R (see FIGURE 1); and either after the bundle is received on said conveyor 30 or just prior to such reception, a second pallet P' is placed upon said bundle. The switch 234 is now momentarily closed. This completes a circuit through the actuating coil 57 of the valve 55 and sets this valve to direct compressed air into the upper ends of the cylinders 48 and open the lower ends of said cylinders to exhaust, thereby causing descent of the clamp bars 43 to clamp the bundle and pallets as seen in FIGURE 4. Should one of the pallets be crushed or otherwise injured by descent of the clamp bars 43, momentary closing of the switch 235 will energize the other actuating coil 57ª of the valve 55, thereby setting this valve to direct compressed air to the lower ends of the cylinders 48 and open the upper ends of said cylinders to exhaust, thereby again raising the clamp bars 43. When the bundle and pallets are properly clamped, the compressed air in the line 54 holds the switch 231 closed and it is necessary that this switch be held closed in order that the motor 19 may be actuated. Should the air pressure be below normal and the bundle therefore inadequately clamped, the switch 231 will not be closed and it will not therefore be possible to actuate the motor 19 until proper air pressure has been restored.

When the bundle is properly clamped as in FIGURE 4, the control switch 218 is momentarily closed. This establishes a circuit through the actuating coil 182 of the motor switch 160 and said coil 182 thus closes said switch 160 and the motor 19 starts to drive the rotor R in bundle-inverting direction (clockwise in FIGURE 4). When the switch 160 closes the contacts 177 and 178 maintain a circuit through the coil 182 and the limit switch 29a, thereby holding said switch 160 closed until said limit switch 29ª is opened by the cam 59ª on the rotor R. The motor 19 thus drives the rotor to invert the bundle B as shown in FIGURE 5, the inverted bundle being then supported by the clamp bars 43. After the limit switch 29ª opens, the rotor R drifts somewhat and during this drifting, the stud 60 on the cam 59 closes the switch 58. This energizes the actuating coil 57ª of the valve 55 and sets said valve to exhaust the compressed air under the then inverted pistons 48 and admit compressed air over said pistons, thereby lowering the clamp bars 43 as indicated in FIGURE 5 and placing the pallet-supported bundle on the rotor conveyor 30ª to be rolled out of the rotor onto the conveyor 32.

Turning of the rotor R in bundle inverting direction of course moves the cam 59 from the limit switch 29 and allows this switch to close in readiness for coaction with the motor switch 185. This switch 185 when closed, causes reverse rotation of the motor 19 to return the rotor to bundle receiving position.

Closing of the switch 185 is effected by momentarily closing the control switch 219. This completes a circuit through the actuating coil 214 of the switch 185 and said coil thus closes said switch. As soon as this switch closes, the contacts 208 and 209 maintain a circuit through the coil 214 and the limit switch 29. The motor thus continues to operate until the rotor cam 59 again opens the limit switch 29, whereupon the switch 185 again opens and the rotor R comes to rest, again in bundle receiving position.

Roll-Through Operation

When the roll-through operation, depicted in FIGURE 6, is required, the hand crank 81 is swung to the position of FIGURE 12. This accomplishes three things. First, the arm 83 allows the switch 86 to open, thereby preventing possible operation of the motor 19. Second, the arms 79 cause the fingers 80 to release the slides 61 of the two mechanisms M from the bolts 38 of the wall 33, allowing this wall to be unbolted and hooked up as in FIGURE 6. Third, the arms 79 abut the blocks 65 of the mechanisms M and hold the rotor R against any idle movement in one direction. At this time, idle movement of the rotor in the other direction, is prevented by the abutting stops 17ᶜ and 28ᵃ.

Release of the bolts 38, causes inward swinging of the locking plates 69 of the mechanisms M; and the fingers 73 of said plates then abut the fingers 80 of the arms 79, thus locking these arms in engagement with the blocks 65 as seen in FIGURE 12, and also locking the rock shaft 76 in the position in which the arm 83 allows the switch 86 to remain open.

It will be seen from the above that the machine cannot be used as in FIGURE 6, until the rotor R is locked and the switch 86 is opened.

When the wall 33 is again bolted in operative position (see FIGURES 7 and 8) the bolts 38 again outwardly swing the locking plates 69 to released positions, thereby freeing the fingers 80 and arms 79. Then, the hand crank 81 may be restored to the position of FIGURE 7. During this movement the springs 68 again engage the slide 61 with the bolts 38, and the arm 83 again closes the switch 86. The machine is then again in condition for normal bundle inverting operation.

From the foregoing, it will be seen that novel and advantageous provision has been disclosed for attaining the desired ends. Attention, however, is again invited to the possibility of making variations.

We claim:

1. In a bundle inverting means, a rotor including a fixed lower roller conveyor to support a bundle to be inverted, and a fixed upper roller conveyor to overlie the supported bundle in upwardly spaced relation therewith; means mounting said rotor on a horizontal axis, said upper and lower roller conveyors being in parallel relation and spaced equidistant from said horizontal axis, means for turning said rotor from a bundle receiving position to a bundle inverting position and vice versa, normally raised bundle clamping means mounted on said rotor adjacent to and independent of said upper roller conveyor, and operating means for said bundle clamping means, said operating means including means for lowering said clamping means to clamp the bundle against said lower roller conveyor before said rotor is turned from said bundle receiving position, whereby said clamp means will support the inverted bundle when said rotor is turned to said bundle inverting position, said operating means also including means for causing lowering of the bundle supporting clamp means to lower the inverted bundle onto the roller conveyor then underlying the inverted bundle.

2. A structure as specified in claim 1, in which said bundle clamping means includes spaced bundle engaging bars unidirectional with and disposed normally recessed between rollers of said upper roller conveyor.

3. A structure as specified in claim 1, in which said bundle clamping means includes spaced bundle engaging bars unidirectional with and disposed normally recessed between rollers of said upper roller conveyor; and in which said operating means includes cylinder and piston assemblies connected with the ends of said bars and mounted on said rotor.

4. In a bundle inverting means, a rotor including two parallel side disks, a fixed lower roller conveyor mounted between said side disks to support a bundle to be inverted, and a fixed upper roller conveyor mounted between said side disks to overlie the supported bundle in upwardly spaced relation therewith, the rollers of said conveyors being parallel with the rotor axis, each of said side disks having two vertical slots between certain rollers of said upper conveyor; two normally raised bundle clamping bars recessed between said certain rollers and having their ends extended through said slots, cylinder and piston assemblies mounted on the outer sides of said disks and having piston rods connected to said ends of said clamping bars; means mounting said rotor on a horizontal axis, said upper and lower roller conveyors being in parallel relation and spaced equidistant from said horizontal axis, means for turning said rotor from a bundle receiving position to a bundle inverting position and vice versa; and fluid pressure admitting and exhaust means for the cylinder of said assemblies, said fluid pressure admitting and exhaust means including valve means operable to so control the admission and exhaust of the fluid as to cause lowering of said clamping bars to clamp the bundle against said lower roller conveyor before said rotor is turned from said bundle receiving position, said valve means being also operable to so control the admission and exhaust of the fluid as to lower said clamping bars when said rotor has been turned to said bundle inverting position, thereby lowering the inverted bundle onto the roller conveyor then underlying said inverted bundle.

5. A structure as specified in claim 4, in which said valve means is manually controlled to move said clamping bars to bundle clamping position, and in which said valve means is automatically actuated to cause lowering of the bundle after inversion.

6. A structure as specified in claim 4, in which electrical operating means is provided for said valve means, said electrical operating means including a manually closed switch to so set said valve means as to cause bundle clamping movement of said clamping bars, said electrical means also including an automatically actuated switch to so set said valve means as to cause movement of said clamping bars to lower the inverted bundle onto the conveyor then underlying said inverted bundle.

7. In a bundle inverting means, a rotor including a fixed lower roller conveyor to support a bundle to be inverted, and a fixed upper roller conveyor to overlie the supported bundle in upwardly spaced relation therewith; means mounting said rotor on a horizontal axis, said upper and lower roller conveyors being in parallel relation and spaced equidistant from said horizontal axis, means for turning said rotor from a bundle receiving position to a bundle inverting position and vice versa, normally raised bundle clamping means mounted on said rotor adjacent to and independent of said upper roller conveyor, and operating means for said bundle clamping means, said operating means including manually controlled means for lowering said clamping means to clamp the bundle against said lower roller conveyor before said rotor is turned from said bundle receiving position, whereby said clamp means will support the inverted bundle when said rotor is turned to said bundle inverting position, said operating means also including automatically controlled means for causing lowering of the bundle supporting clamp means to lower the inverted bundle onto the roller conveyor then underlying the inverted bundle.

8. A structure as specified in claim 1, in which said operating means includes a manually closed switch to cause lowering of said clamp means to bundle clamping position, and in which said operating means includes an automatically actuated switch to cause movement of said clamp means to lower the inverted bundle onto the conveyor underlying said inverted bundle.

9. In a machine in which an electrically actuated rotor is mounted on a horizontal axis to receive a bundle from one conveyor, invert the received bundle and position it for movement onto a second conveyor, said rotor being usable also as a bridge for conducting a bundle from said one conveyor to said second conveyor without inverting the bundle, and in which the electrical actuating means for said rotor includes a normally closed switch for prohibiting electrical rotor operation when said switch is opened; normally released manually applied locking means for locking said rotor when the latter is to be used as a bridge, and means operatively associated with said locking means and switch for assuring opening of the latter when said locking means is moved to operative position.

10. A structure as specified in claim 9, in which said manually applied locking means includes a rotor engaging member, a rock shaft carrying said member, and a handle for turning said rock shaft; said rock shaft having an arm which normally holds said switch closed but allows said switch to open when said rock shaft is turned to engage the aforesaid rotor engaging member with the rotor.

11. In a machine in which a rotor is mounted on a horizontal axis to receive a bundle from one conveyor, invert the bundle and position it for movement onto a second conveyor, said rotor having a movably mounted wall to limit the movement of the bundle into the rotor, said rotor being usable as a bridge for conducting a bundle from said one conveyor to said second conveyor when said wall is held in an inoperative position; wall locking means for normally locking said wall in operative position, manually applied rotor locking means for locking said rotor when the latter is to be used as a bridge, and means operatively associated with said wall locking means and said rotor locking means for releasing the former when the latter is applied.

12. In a machine in which a rotor is mounted on a horizontal axis to receive a bundle from one conveyor, invert the bundle and position it for movement onto a second conveyor, said rotor having a movably mounted wall to limit the movement of the bundle into the rotor, said rotor being usable as a bridge for conducting a bundle from said one conveyor to said second conveyor when said wall is held in an inoperative position; a manually retractable bolt on said wall and normally engaging said rotor to hold said wall in operative position, bolt locking means mounted on said rotor and normally engaging said bolt to hold the latter against retraction, and a rotor locking member manually engageable with said rotor to lock the latter when it is to be used as a bridge, said rotor locking member having a portion which releases said bolt locking means when said member is moved into engagement with said rotor.

13. A structure as specified in claim 12; together with self-applied means for locking said rotor locking member in operative position, said self-applied locking means being normally held in released position by said bolt and upon retraction of said bolt being movable to operative position.

14. In a machine in which a rotor is mounted on a horizontal axis to receive a bundle from one conveyor, invert the bundle and position it for movement onto a second conveyor, said rotor having a movably mounted wall to limit the movement of the bundle into the rotor, said rotor being usable as a bridge for conducting a bundle from said one conveyor to said second conveyor when said wall is held in an inoperative position; a manually retractable horizontal bolt on said wall and normally engaging said rotor to hold said wall in operative position, said rotor having a side disk through which the outer end of said bolt extends, a slide mounted for horizontal movement on the outer side of said disk, said slide and said outer end of said bolt having coacting portions whereby said slide locks said bolt against retraction until said slide is moved inwardly away from the peripheral edge of said disk, spring means biasing said slide to bolt locking position, an abutment secured to the outer side of said disk near said edge thereof, stationary bearing means spaced downwardly from said abutment, a rock shaft mounted in said bearing means with its axis parallel to the axis of the rotor, and an upwardly extending arm on said rock shaft, said arm being swingable inwardly into engagement with said abutment when said rock shaft is turned in one direction, said arm having an upwardly projecting finger to strike a portion of said slide and move the latter to bolt releasing position when said arm is swung into engagement with said abutment.

15. A structure as specified in claim 14, in which said outer end of said bolt normally projects beyond the outer side of said slide, a locking plate disposed at said outer side of said slide, said plate being pivotally mounted at its upper edge on said disk and being normally held in an outward position by said projecting end of said bolt, said locking plate having a portion at its lower edge to engage and lock said upwardly projecting finger of said arm when the latter is swung inwardly into engagement with said abutment, and means urging said locking plate inwardly toward said slide to cause said locking plate to lock said arm in engagement with said abutment when said locking plate is released by retraction of the aforesaid bolt.

16. A structure as specified in claim 14, in which electrical actuating means are provided for said rotor, said electrical actuating means including a stationarily mounted switch which must remain closed in order that said actuating means may function, said rock shaft having an additional arm associated with said switch, said additional arm being so cooperable with said switch as to assure that said switch shall remain normally closed but shall open when said rock shaft is turned in the aforesaid direction.

References Cited in the file of this patent

UNITED STATES PATENTS

| | | |
|---|---|---|
| 1,209,621 | Richardson | Dec. 19, 1916 |
| 1,783,814 | Schroeder et al. | Dec. 2, 1930 |
| 1,834,499 | Richter | Dec. 1, 1931 |
| 1,905,379 | Gotthardt | Apr. 25, 1933 |
| 2,125,548 | Cowl | Aug. 2, 1938 |
| 2,520,252 | Mutchler | Aug. 29, 1950 |
| 2,732,083 | Smith | Jan. 24, 1956 |
| 2,772,766 | Kellam | Dec. 4, 1956 |
| 2,838,184 | MacCurdy | June 10, 1958 |
| 2,865,516 | Hedderich | Dec. 23, 1958 |